United States Patent [19]

von Seld

[11] Patent Number: 5,205,392
[45] Date of Patent: Apr. 27, 1993

[54] METHOD AND APPARATUS FOR FORMING WORKPIECES, USING A SEQUENCE OF STATIONARY FORMING STATIONS

[75] Inventor: Sigurd von Seld, Hamburg, Fed. Rep. of Germany

[73] Assignee: Maschinenfabrik Rissen GmbH, Hamburg, Fed. Rep. of Germany

[21] Appl. No.: 773,851

[22] PCT Filed: Apr. 23, 1990

[86] PCT No.: PCT/EP90/00653
§ 371 Date: Oct. 21, 1991
§ 102(e) Date: Oct. 21, 1991

[87] PCT Pub. No.: WO90/12673
PCT Pub. Date: Nov. 1, 1990

[30] Foreign Application Priority Data

Apr. 21, 1989 [DE] Fed. Rep. of Germany ....... 3913213

[51] Int. Cl.[5] .............................................. B65G 17/00
[52] U.S. Cl. ............................... 198/343.1; 198/343.2; 198/474.1; 29/430; 29/792; 29/563; 72/422
[58] Field of Search ............... 198/343.1, 346.2, 339.1, 198/474.1, 476.1, 477.1, 478.1, 343.2; 72/422; 29/430, 563, 785, 792

[56] References Cited

U.S. PATENT DOCUMENTS 3,765,268 10/1973 McMillan .
3,868,867 3/1975 Hoos .
4,697,688 10/1987 Kimbell et al. .................. 198/346.2

FOREIGN PATENT DOCUMENTS 1750279 3/1971 Fed. Rep. of Germany .
3427699 2/1986 Fed. Rep. of Germany .
1376657 9/1964 France .
2463081 2/1981 France .

Primary Examiner—Joseph E. Valenza
Attorney, Agent, or Firm—Chilton, Alix & Van Kirk

[57] ABSTRACT

A device for machining workpieces which includes a series of stationary machining stations (2, 42, 65, 81) arranged around a circle and a row of workpiece holders (3, 38, 64, 82) which are clamped temporarily in the machining stations (2, 42, 65, 81) and periodically interchanged. To ensure quasi-continuous operation with stationary machine stations (2, 42, 65, 81), an interchanger (5, 19, 44, 60, 87) rotates concentrically about the circle (41) of the machining stations (2, 42, 65, 81), grips the holders (3, 38, 64, 82) in succession and forms a transfer or interchange path (6, 45, 62, 90) for the holders (3, 38, 64, 82) to be interchanged between one machining station (2, 42, 65, 81) and the next. The interchange path contains a number of workpiece holders (27) which differs from the number of machining stations (2, 42, 65, 81) in the region bridged by the interchange path (6).

18 Claims, 4 Drawing Sheets

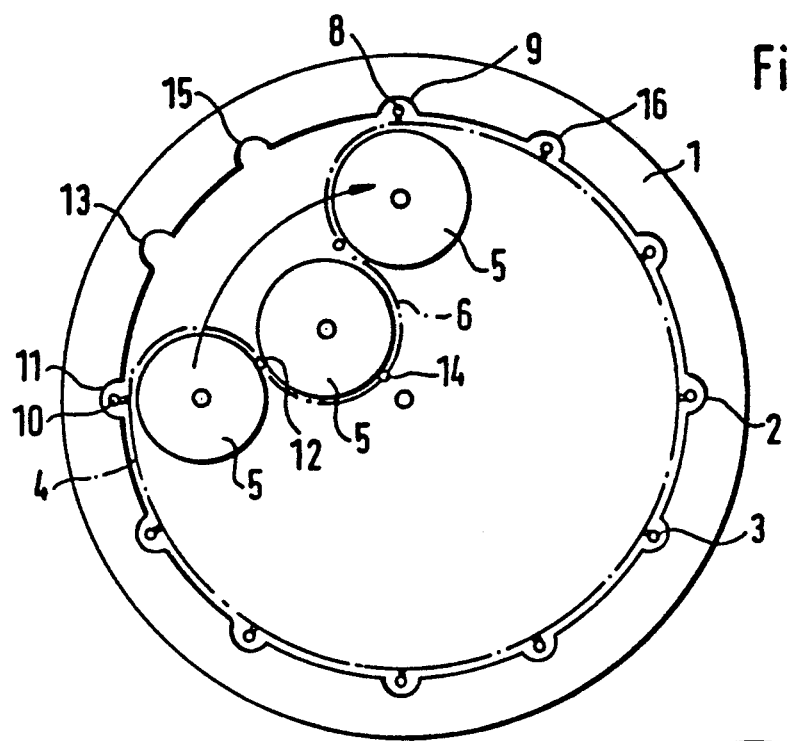
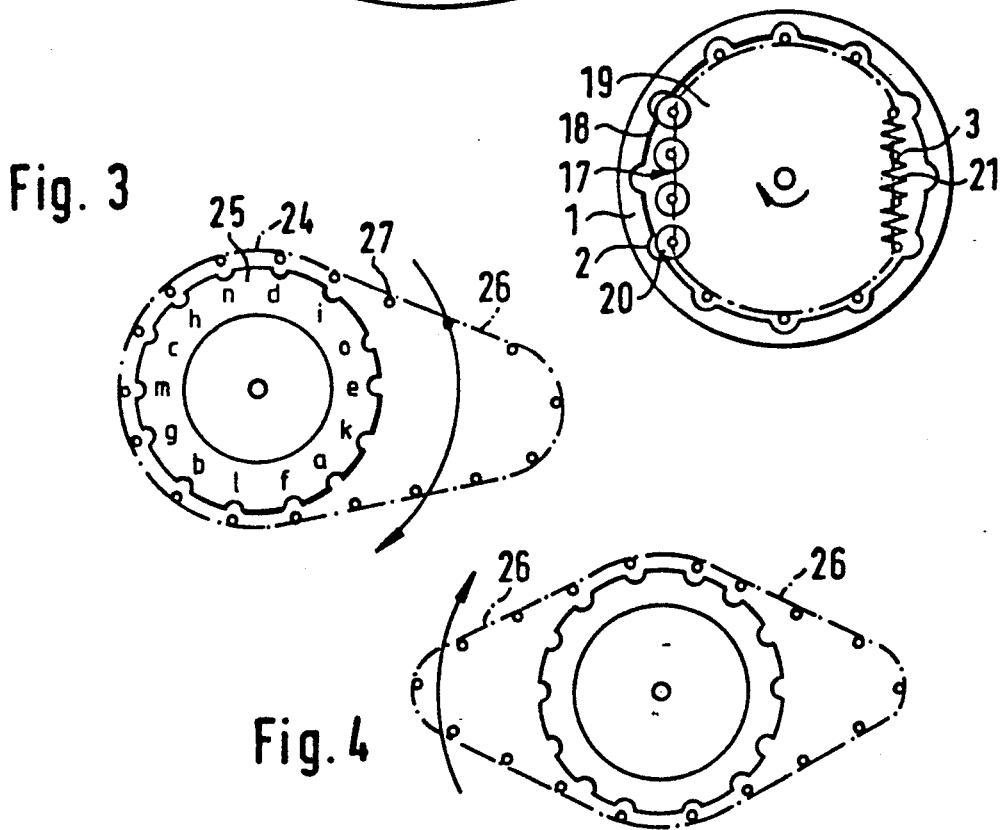

METHOD AND APPARATUS FOR FORMING WORKPIECES, USING A SEQUENCE OF STATIONARY FORMING STATIONS

The invention relates to a method and an apparatus for guiding a closed row of workpiece holders through a closed sequence of forming stations which are arranged in a stationary position in a circular shape and in which the workpiece holders are temporarily held in place and periodically transferred.

In the manufacture of mass products which pass through a row of forming stations, such as, for example, packing containers and paper cups, a row of stationary forming stations having forming tools is provided in a known method of this type (FR-B-1,376,657) which forms the basis for the wording of the claims, which forming stations have running along them a conveying member, for example a chain or a rotatable table having holders for the workpieces, which holders are stopped temporarily in the forming stations for carrying out the forming steps (FR-B-1,376,657). The transfer of the workpieces from one station to the next takes place simultaneously for all workpieces. As a result, considerable mass forces occur which impose limits on the acceleration of the operating sequence. In contrast to such a discontinuous machine operation, there are also continuously working machines in which workpiece holders which are arranged on a chain run around rotary tables on which tools are arranged. In these machines, usually only forming operations of the same type can be carried out by tools of the same type on each rotary table. A multiplicity of tools must therefore be provided in each case, when entails considerable expense. However, machines of such a type are also known in which a plurality of different series of tools are arranged on a rotary table and the workpieces are brought in succession into connection with various of these tools by the chain which carries the workpiece holders being run over an external deflection sprocket, the deflection section being selected to be so large that the workpiece holders, after-passing through the deflection section at the rotary table, reach a forming station which is of a different type from the forming position passed beforehand (FR-A-2,463,081). Since the tools in such continuously working machines are always arranged on revolving rotary tables, they are not suitable for such forming operations in which, on account of high precision or the size of the tools or for other reasons, the revolving arrangement of the tool is undesirable or impossible.

The object of the invention is therefore to provide a method of the type mentioned at the beginning which permits a stationary tool arrangement in a continuous mode of operation.

This object is achieved according to the invention in that the forming stations are constantly occupied by workpiece holders except for at least one empty forming station and the workpiece holders, which are arranged flexibility in a row and the number of which is different from the number of forming stations, are transferred in succession by means of a transfer means, revolving continuously and concentrically to the sequence of forming stations, by first of all one workpiece holder being transferred to the empty forming station, by a following workpiece holder being transferred to the forming station occupied beforehand by the first workpiece holder, etc.

Compared with the known machined described at the beginning in which all workpiece holders are transferred simultaneously, a considerable approximation to a continuous mode of operation is achieved by the invention by the workpiece holders not all being transferred simultaneously but by their being transferred individually in succession. The division of the transfer operation into a multiplicity of individual steps allocated to the respective holding positions reduces the masses to be accelerated and braked in each case to a small fraction, the continuous advance of the transfer operation from one holder position to the next providing the precondition for substantial masses, namely those parts which perform the transfer movement, to be able to be moved continuously.

Compared with the known machines mentioned in the second place, the invention has the advantage that the tools can be arranged in a stationary position without having to give up the advantage of the continuous mode of operation.

The kinematic principle utilized by the invention is certainly known from mechanism technology (DE-A-1,750,279); but it was not obvious to the person skilled in the art, in the search for suitable conveying principles for a row of workpieces opposite a row of forming stations, to look around for the forming stations in the field of mechanism technology nor to check the auxiliary elements used in a specific case there between drive and output for transmitting the movement for their suitability as workpiece carriers in forming machines.

The method is conveniently carried out by means of an apparatus which is distinguished by the fact that a transfer means revolves concentrically to the circle of the working stations arranged in a stationary position, which transfer means takes hold of the workpiece holders in succession, which workpiece holders are connected like a chain, and forms a transfer path for the workpiece holders to be transferred, from one forming station to a following forming station, which transfer path contains a number of workpiece holders (for example twelve, fourteen) which differ from the number of forming stations (for example thirteen, fifteen) in the area bridged by the transfer path.

In the practical realization of the invention, the row of workpiece holders is allocated in a flexible form to the rigid, stationary and equi-spaced arrangement of the tools so that this row of workpiece holders can on the one hand come into contact with the row having a fixed configuration and can on the other hand be lifted from the latter in the transfer area. In this context, the term flexibility is to be understood in the widest sense. That does not mean that the individual holders have to be firmly connected to one another in the longitudinal direction of the row, although this is advantageous. On the contrary, the flexible row can also be formed by unconnected workpiece holders which are each only held in place from position to position by special members. These members can be, for example, on the one hand fixing members in the forming stations and on the other hand holding members at the transfer path, which come into effect when the workpiece holders are received by the transfer means, are stored in their sequence and are deposited again in another forming station. So that the transfer effect comes about, the number of workpiece holders in the transfer path must be correspondingly larger or smaller than the number of forming stations in the area bridged by the transfer path. If the workpiece holders are connected like a chain at constant distances apart, the transfer path must accordingly be shorter or longer than the arc, bridged by it, of the row of forming stations by one pitch of the forming stations or workpiece holders or a by a whole multiple thereof. Instead, provision can be made for the distance between the workpiece holders in the transfer path to be controlled in such a way as to differ from the distance in the forming stations. If the workpiece holders are connected to one another like a chain, the different distance apart according to the invention can be realized by the connection between the workpiece holders being produced by a guide-link arrangement of variable length, the size of which is determined by an additional controlling cam. In another embodiment, which is suitable in particular if the workpiece holders are not connected, the transfer means is provided with a drive device for the workpiece holders, which drive device takes hold of each individual workpiece holder and subjects it in the transfer means to a conveying movement at a suitable distance from the adjacent workpiece holders and at a suitable speed. Finally, it is also possible to connect the individual workpiece holders to one another by springs which enable them, depending on the spatial relationships imposed on them by the transfer means, to assume a greater or smaller distance from one another than corresponds to the distance between the forming stations. Here, the spring force provides for a uniform distribution of the movement section present in the transfer means over the number of holder spaces and intermediate spaces located therein. In this way, both a reduction (compression spring) and an increase (tension spring) in the distances between the holders relative to the distances between the forming stations can be achieved. This solution can be combined with positive guidance of the workpiece holders at least at the end of the transfer path so that the workpiece holders can pass accurately into the forming stations allocated to them.

According to the invention, the transfer path can revolve inside the circle of the forming stations, The transfer means is therefore located predominantly radially inside the space circumscribed by the support body of the forming stations. This results in the advantage that only a relatively small number of workpiece holders are needed. At the same time, the tools are readily accessible from outside, However, it can also be advantageous to have the transfer path revolve outside the circle of the forming stations.

In a particularly advantageous embodiment of the invention, the form of the row of workpiece holders is determined by the periphery of a guide cam on which the workpiece holders revolve and which on part of its periphery forms the transfer path, while the remaining part follows the course of the forming stations in a circular shape, in which case this guide cam revolves inside the support of the forming stations.

It is often necessary for the workpiece holders to perform a movement (separate from the transfer movement) relative to the tools. If this is connected with a complicated control system, this control system will often be allocated to the tool. But if it is of a simple nature, it can be advantageous to allocate it to the workpiece holders. As a result, the relative movement can be derived from the revolving movement of the transfer means. This is possible by means of controlling cams which rotate with the transfer means, while the holers or tools are provided with control parts which are acted upon by a controlling cam and thereby transmit the movement. If different movements are to be provided at different tools, different controlling cams can also be provided which have different basic diameters or vertical position and act only on certain control members having correspondingly matching position at certain tools. Whereas lifting movements can be produced by controlling cams, rotary movements can be transmitted by parts rolling on one another, e.g. by means of a toothed quadrant which is provided on one part and interacts with a pinion on the other part.

It can certainly be particularly advantageous in the context of the invention to derive movements of the tools or of the workpieces from the relative rotation of the two machine parts, but if it is of course also possible to provide separate drives which are synchronously controlled in a revolving manner.

Another apparatus for carrying out the method according to the invention is distinguished by the fact that facing a group of n forming stations is a group of $(n-1)$ workpiece holders which are individually connected to the conveyor in such a way that they can be moved in the conveying direction by at least the distance between the forming stations and whose connecting points with the conveyor, revolving concentrically to the sequence of forming stations, are at a distance from one another which is greater than the distance between the forming stations by the factor $n/(n-1)$, and that a control device is provided for transferring a workpiece holder adjacent to the empty forming station into the empty forming station, for transferring the following workpiece holder into the forming station consequently becoming empty, etc.

The arrangement can be circular, in which case the said distances can be assumed to be angular distances. Instead, an at least partly extended arrangement is also possible in which a preferably closed chain conveyor carrying the workpiece holders faces an extended row of forming stations. The return side of this chain conveyor can likewise interact with a row of forming stations, but this is not necessary.

The speed of the conveyor is so great that it moves further during each transfer operation by the difference between the distance between the forming stations and the distance between the workpiece holders, and in fact in the opposite direction to the direction in which the transfer operations follow one another.

According to the invention, this apparatus can be constructed in such a way that the workpiece holders are connected to the conveyor by a spring loading them in the transfer direction so that the transfer movement takes place under the action of this spring. A stop is provided at the forming station empty in each case, which stop retains the workpiece holder which, under the action of the spring, is in the transfer movement. So that the workpiece holder does not prematurely leave the preceding forming station, appropriate control devices which hold it in place can be provided there. These control devices can comprise the stop mentioned, this stop being removed at the moment at which the transfer movement is to start, or the workpiece holder being lifted past this stop by another part of the control device. These are control devices which can be provided at every forming station and can be activated at the desired moment. However, a revolving tripping means can also be provided as the control device, which tripping means in each case acts on the workpiece holder to be released from a forming station and transferred or on the means which hold this workpiece holder in place in the forming station.

The invention is described in more detail below with reference to the drawing, in which:

FIGS. 1 to 4 show four plan views of different machine configurations,

Figure 6:
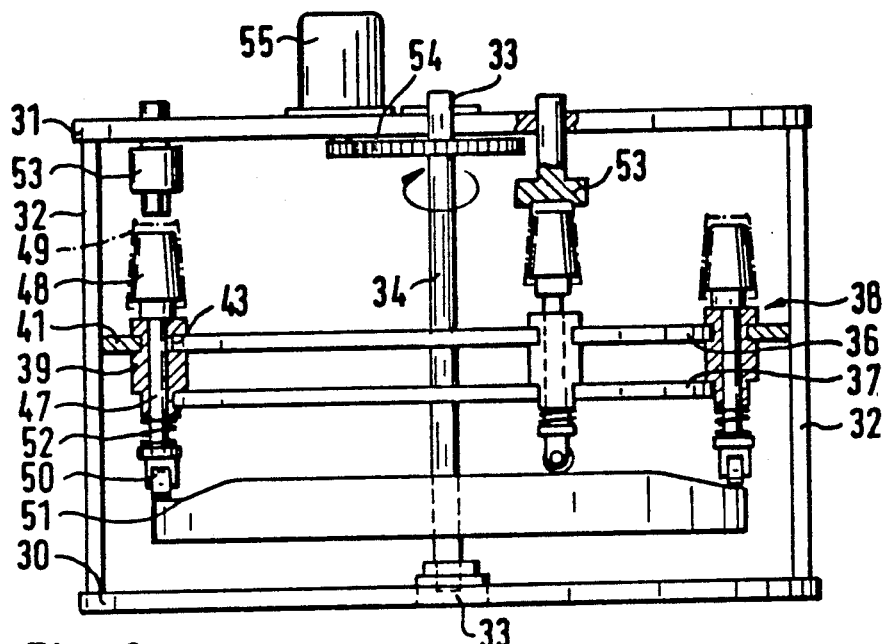
FIG. 6 shows a sectional view of the embodiment shown in FIG. 5.

In the embodiment according to FIG. 1, an annular support body 1 is provided which has a row of forming stations 2 with tools on its inside which are schematically indicated by semi-circles open to the inside. They move into matching position with workpiece holders 3 which are connected to one another as a flexible conveyor row by a chain 4 which is held over the larger part of the periphery on the inside of the support body 1 by means not shown, whereas in the part appearing at the top left in the representation it is lifted therefrom by deflection sheaves 5 which together form a W-shaped path 6 for the chain 4, which path 6 represents the transfer path. The sheaves 5 are mounted on a common support which is not shown in the drawing and on which they revolve in the direction of the arrow inside the support body 1. The transfer path 6 contains one holder more than the corresponding circular arc of the support body 1. The drawing illustrates that the deflection path is just on the point of lifting a holder 8 out of the associated forming position 9 of the support body, while another holder 10 is just being inserted into a position 11. The penultimate holder 12 in the transfer path will pass into the position 13, the holder 14 into the position 15, the next holder into the position 9 just becoming free and therefore the holder 8 into the following forming position 16. During one revolution of the transfer path 6, all holders are transferred into the next forming position. During the transfer movement, each holder describes a hypocycloid having an approximately sinusoidal profile of the acceleration without acceleration peaks. That is, the transfer movement takes place smoothly and without jerks.

Whereas FIG. 1 shows an arrangement having only one transfer path, that according to FIG. 2 has two transfer paths 17. This means that each holder 3 of the row of holders is transferred twice per revolution. The row of holders is carried by the periphery of a rotor 19 which revolves in the direction of the arrow. Each transfer path 17 contains four workpiece holders, while the bridged arc of the support body 1 comprises only three forming stations in each case. This means that the workpiece holders in the transfer path have to be brought closer to one another. In the example indicated on the right in the figure, they are connected to one another by compression springs which are compressed in the area of the transfer path. In the example indicated on the left-hand side, the workpiece holders are provided with spacer discs 20 which determine their mutual minimum distance apart and thereby provide for a defined position of the workpiece holders in the transfer path. This is necessary so that the workpiece holders can move in a trouble-free manner into the forming position intended for them without this necessitating complicated guide or drive devices.

The exemplary embodiments according to FIGS. 3 and 4 show the outer revolution of a chain 24 of workpiece holders 27 around the stationary support body 25. According to FIG. 3, the length of the transfer path 26 is to be three holder distances longer than the corresponding circular arc of the support body 25. The workpiece holders 27 are therefore shifted three steps further during each revolution. The support body 25 has fourteen forming stations, which are designated by the letters a to o and are occupied by a workpiece holder 27 in their alphabetical order. If there were fifteen positions instead of fourteen, three groups of four forming stations each would be formed on the support body, and each workpiece holder 27 would in each case pass through only one group of the three groups. If there are a small number of forming steps, this can be convenient in order to correspondingly increase the output. If, however, the workpiece holders are to pass through all forming stations of the support body and the transfer difference is greater than one holder, the number of holding stations at the support body cannot be divided by the transfer difference.

The arrow in FIG. 3 indicates that the transfer paths 26 are to revolve around the support body 25.

FIG. 4 shows a modification of FIG. 3 having two transfer paths 26 at the periphery which are offset by 180° relative to one another. This results in identical cycle times. If different cycle times are desired, different angular offset can be selected.

Figure 5:
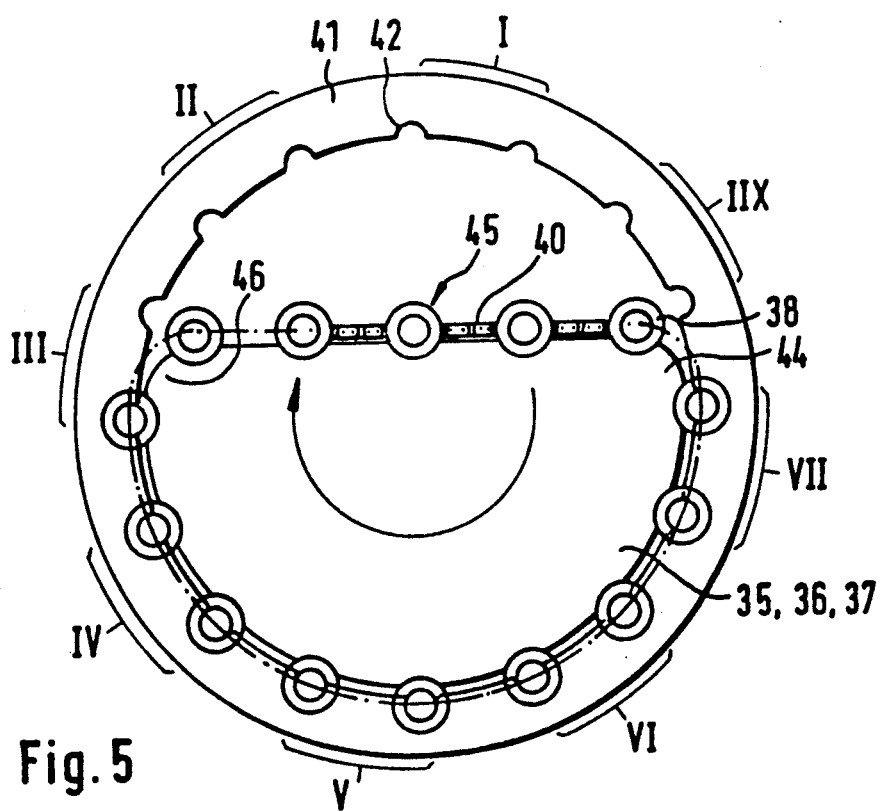
FIG. 5 shows a detailed plan view of an actual embodiment.

In the exemplary embodiment in FIGS. 5 and 6, the machine frame, consisting of bottom plate 30, top plate 31 and connecting columns 32, forms a central, coaxial bearing arrangement 33 for the shaft 34, which is continuously driven in the direction of the arrow by the motor 55 via gearing 54. The shaft carries the rotor 35, which is formed by the plates 36 and 37 which are fastened to the shaft 34 and, as shown in FIG. 5, have an approximately semicircular, rounded-off outline. Guided thereon are the workpiece holders 38, which comprise guide bodies 39 which slide on the periphery of the plates 36, 37 and are connected to one another by a roller chain 40. The guide bodies 39 have peripheral recesses in which the margins of the plates 36, 37 engage. Arranged on the frame at the same height as the plate 36 is an annular plate 41 which has peripheral recesses 42 which serve to accommodate the guide bodies 39. A guide body 39, which on the one hand sits in such a peripheral recess 42 and on the other hand is held therein by the margin 43 of the plate 36, is positioned in a well-defined manner. It is lifted out of this position as soon as the corner 44 of the rotor 35 or of the plates 36, 37 reaches it. The flexible conveying row held together by the chain 40 is then lifted from the annular plate 41 and directed into the transfer path 45. When a guide body 39 reaches the further corner 46 of the motor, it is re-inserted into peripheral recess 42 of the annular plate 41.

Each guide body 39 contains a guide rod 47 which carries at the top end a mounting mandrel 48 for a paper cup blank 49. At the bottom end, it carries a roller 50 which interacts as a follower with a controlling cam 51 connected to shaft 34 of the rotor in such a way as to be fixed in terms of rotation. The guide rod 47 is pushed into its bottom position by a spring 52. This arrangement results in each mounting mandrel 48 being lifted by the controlling cam 51 as soon as the associated holder is inserted into a forming position.

Allocated to the recesses 42 of the annular plate 41 are tools 53 which move into forming engagement with the paper cup 49 due to the lifting movement just described of the mounting mandrel 48. In so far as these are tools which come into engagement with the mounting mandrel 48 or the paper container 49 carried by it only by axial relative movement, as is the case with the forming of the flanged edges, they can therefore be of very simple design.

In the exemplary embodiment according to FIGS. 5 and 6, the transfer path comprises five holders, while the associated circular arc of the support plate (annular plate 41) has seven holding recesses 42. The difference is two. The support body has sixteen holding positions, that is, an even number. This means that each workpiece holder 38 interacts only with the eight holding positions of one of two groups of holding positions of the support body. In the case of eight forming steps per workpiece, this results in a doubling of the output compared with a machine having only eight forming stations of the support body.

A machine of the type shown in FIGS. 5 and 6 can be used, for example for forming the base of a paper cup, in the following way:

| | |
|---|---|
| Holding position I: | Base feed |
| Holding position II: | Feed of the cup shells |
| Holding position III: | Hot-air treatment of the base area, 1st phase |
| Holding position IV: | Hot-air treatment, 2nd phase |
| Holding position V: | Flanging |
| Holding position VI: | Pressing the base |
| Holding position VII: | Cup lifting |
| Holding position VIII: | Cup discharge |

Appropriate devices can be used for the roll forming of the mouth of the cup.

Figure 7:
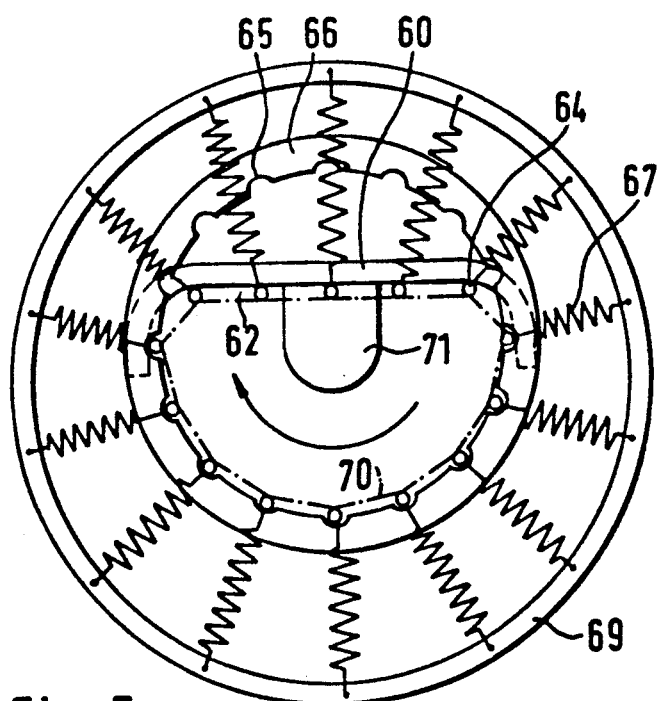

In the embodiment according to FIG. 7, the workpiece holders 64 are pulled radially outwards by springs 67 or the like, the other end of which is fastened to a ring 69. They are thereby pulled into the holding positions 65 of a fixed ring 66 which carries the tools at these holding positions. On a rotor 71, a guide rail 60 revolves concentrically to the ring 66, which guide rail 60 forms the transfer path 62 by virtue of the fact that it lifts with its leading end the workpiece holders 64 out of the holding positions 65 against the spring force 67 and releases them again at its trailing end for insertion into the nearest holding position 65. Here, the length of the transfer path in the example shown is shorter than the corresponding circular arc of the ring 66 by two holders or holding positions. In other words, in the example given, the workpiece holders 64 are shifted further by two holding positions 65 during every revolution of the guide rail 60 at the ring 66. This transfer movement can be followed by the ring 69, since it can rotate freely along with the guide rail 60. Furthermore, it is a characteristic of this design that a fixed connection between adjacent workpiece holders 64 is not necessary. There can be a chain 70, but it can be advantageous to dispense with it. However, so that the workpiece holders perform a uniform movement in the transfer path and their arrival at a certain holding position 65 is ensured, it is convenient to equip them with spacers, i.e. devices which predetermine their minimum distance apart. This minimum distance apart need not conform to the mutual distance between the holding positions 65 but can be smaller.

Instead of the springs 67 which pull the workpiece holders 64 outwards, devices can be provided which push the workpiece holders 64 outwards from the centre or an area close to the centre.

Figure 8:
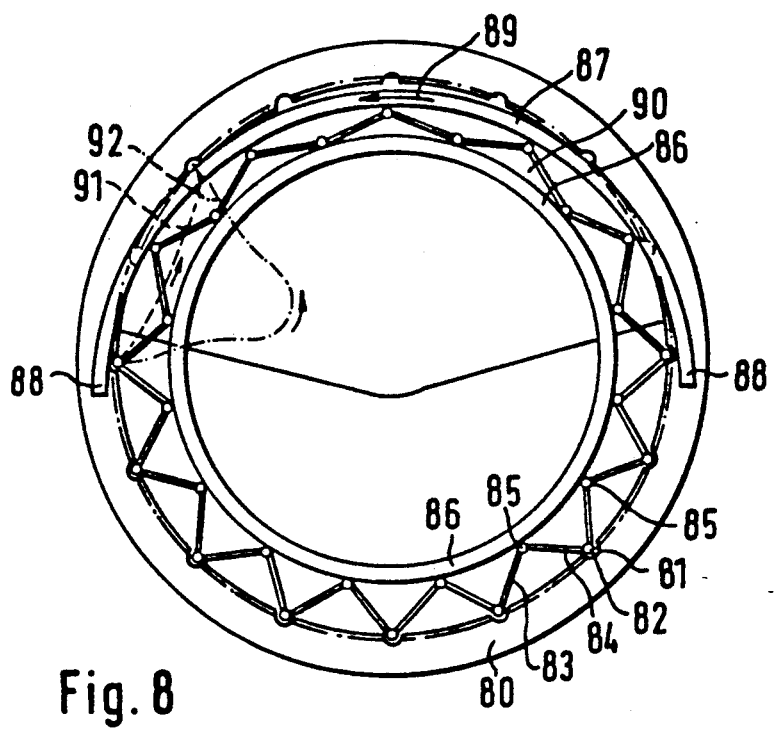
FIGS. 7 and 8 show plan views of further embodiments.

In the example in FIG. 8, the annular support body 80 forms recesses 81 as forming stations for workpiece holders 82, which form a closed chain since they are each connected to one another by two guide links 83, 84 which contain articulations at both the workpiece holders 82 and the second connecting point 85. The articulation points 85 are guided by an inner guide ring 86 concentric to the support body 80, the guide surface being circular, at least in that arc in which the workpiece holders 82 lie in the forming stations 81. It is convenient to design this surface to be entirely circular, since it can then be arranged in a stationary position. Otherwise, it is connected for common rotational movement to the guide rail 87, which in this exemplary embodiment, together with the guide ring 86, forms the transfer means.

At its ends 88, the guide rail 87 has a centre distance which is at least just as large as that of the workpiece holders 82 sitting in the forming stations 81 or of a part which is connected to the workpiece holder and interacts with the guide rail, so that the workpieces, during their revolution in arrow direction 89, can be lifted to the inside out of the mounting recesses of the forming stations 81. During the remaining course, the guide rail 87 has a centre distance which is less than that of the support body 80 so that the lifted-out workpiece holders can be directed past the latter.

Whereas outside the arc encompassed by the guide rail 87 the radial distance between the support body 80 and the inner guide ring 86 is constant and so large that the zigzag-shaped arrangement of the guide links 83 corresponds to the peripheral distance between the forming stations 81, the radial distance between the inner guide ring 86 and the guide rail 87 is less between the ends 88 of the latter. This results in the zigzag-shaped arrangement of the guide links 83 being extended and thus in the peripheral distance between the workpiece holders 82 being increased, and in fact exactly in such a way that a whole number less of workpiece holders 82 than forming stations 81 is contained in the arc covered by the guide rail 87. In the example shown, the difference comes to two, the total number of the forming stations being even. This means—just as in the example in FIG. 7—that there are two tool rows, each workpiece passing through only one of the two rows.

An important advantage of the embodiment according to FIG. 8 consists in the fact that a transfer route 91 for the workpiece holders can be defined by the course of the transfer path 90 between the guide rail 89 and the inner guide ring 86, which transfer route 91 is ideally short and low in acceleration. It will be recognized from the course of the transfer route 91 that this transfer route 91 is substantially shorter than the route 92 which results from the use of the apparatus according to FIGS. 5 and 6.

It goes without saying that the apparatus could also be constructed with a transfer route in which the distances between the workpiece holders are not larger but smaller than in the rest of the revolving area, namely by the distance between the guide surfaces of the inner guide ring 86 and the outer guide rail 87 being not reduced but increased. This is possible in the case of an external support body 80 by drawing in the guide surface of the inner guide ring 86 in the area of the guide rail 87 and is obtained in the case of an internal support body 80 having a guide rail 87 revolving on the outside by the radial expansion of the latter in the transfer area.

Figure 9:
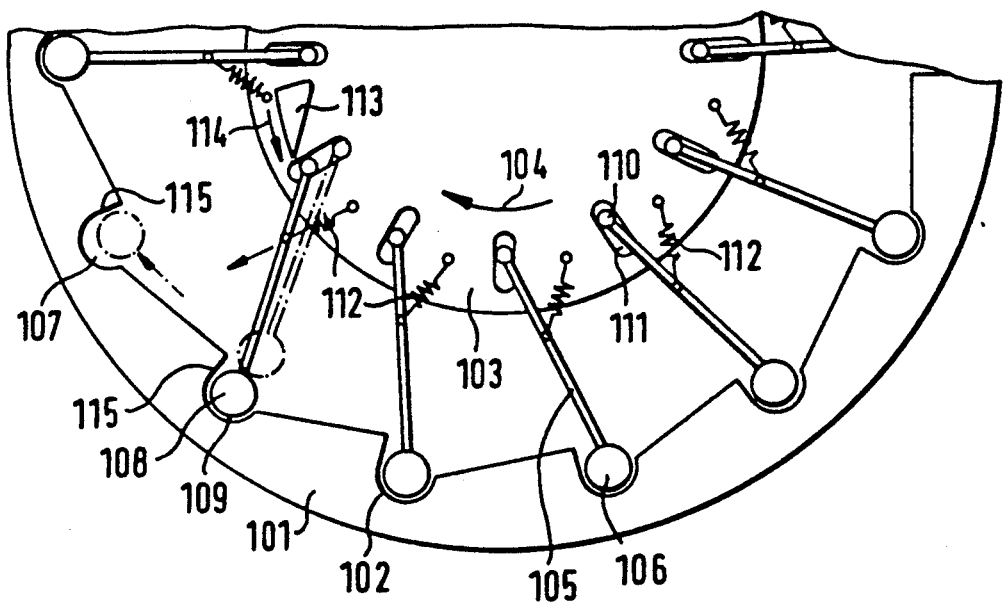
FIG. 9 shows a partial plan view of a final embodiment.

In the last embodiment according to FIG. 9, the preferably stationary support 101 for a group of seven forming stations 102 which extend over 180° of the circular arrangement will be recognized. An arrangement conforming thereto is located on the other side (not shown) of the arrangement. But the arrangement can of course also extend over the full circle.

Provided concentrically to the support 1 is a disc 103 which is driven in arrow direction 104. Via arms 105, it carries workpiece holders 106, of which there are six in the arrangement shown which are allocated to the seven forming stations 102. Accordingly, one forming station 107 is always empty and is ready for receiving a workpiece holder 108 to be transferred which is located in the forming station 109 located in front thereof.

The arms 105 are guided with pins 110 in elongated holes 111 of the disc 103 in such a way that they can assume different positions in the peripheral direction on the peripheral line of the forming stations 102, which positions lie at a distance apart corresponding to at least at the distance between the forming stations 102. Furthermore, a compression spring 112 is arranged between the disc 103 and each of the arms 105 in such a way that the workpiece holders 108 can be acted upon both radially outwards and in the direction 104 of rotation of the disc, that is, in the transfer direction. The workpiece holders 106 are held in place in the forming stations 102, which are constructed as recessed portions, by the spring force (and if need be by further means not shown in the representation).

To transfer a workpiece holder 108 into the empty forming station 107, this workpiece holder 108 must therefore be lifted out of the forming station 109. For this purpose, a revolving cam 113 is provided which revolves in arrow direction 114, and in fact once during each machine cycle, as a result of which the transfer movement is initiated for all workpiece holders, one after the other.

The cam 113 acts in each case on that workpiece holder which is nearest to the forming station 107 empty in each case. The mounting of the cam 113 in the disc 103 is then also in each case approximately in alignment with the empty forming station 107. The cam 113 acts on the pin 110 in such a way that the latter, as indicated by chain-dotted lines for the workpiece holder 108, is lifted towards the centre against the action of the spring 112, as a result of which the workpiece holder 108 is lifted past the stop 115 which limits the recessed portion of the relevant forming station 109 on the transfer side. Under the action of the spring 112, the arm 105 can now shift with the workpiece holder 108 to the empty forming station 107 until the workpiece holder is stopped by the stop 115 located there and is pressed by the spring into the recessed portion of the forming station.

It goes without saying that active drive members which are controlled in the operating cycle could also take the place of the springs 112, and that the lifting function of the cam 113 with regard to the pins 110 could also be replaced by a device which is in each case provided at the individual mountings and is individually controlled. Furthermore, it may be noted that the connection between the workpiece holders 106 and the disc 103 by the arms 105 is not necessary if provision is made in another manner for suitable guidance of the workpiece holders. The term conveyor used in the claim is therefore to be understood in the widest sense.

I claim:

1. Method of guiding a closed row of workpiece holders through a closed sequence of forming stations which are arranged in a stationary position in a generally circular shape and in which the workpiece holders are temporarily held in place and are periodically transferred, wherein the forming stations are constantly occupied by workpiece holders except for at least one empty forming station, and the workpiece holders, which are arranged flexibly in a row and the number of which is different from the number of forming stations, are transferred in succession by a transfer means which revolves continuously and concentrically relative to the sequence of forming stations, and wherein each workpiece holder is transferred individually to an empty forming station, and a following workpiece holder is transferred to the empty forming station formerly occupied by the previously transferred workpiece holder.

2. Apparatus for forming workpieces, comprising a plurality of stationary forming stations arranged along a circle and a closed row of workpiece holders which are temporarily held in place in the forming stations and are periodically transferred, wherein a transfer means is provided which revolves concentrically to the circle of the forming stations, takes hold of the workpiece holders in succession, and forms a transfer path for the holders to be transferred, from one forming station to a following forming station, which transfer path contains a number of workpiece holders which differs from the number of forming stations in the area bridged by the transfer path, and wherein the row of workpiece holders revolves around a guide cam which on part of its periphery forms the transfer path.

3. Apparatus according to claim 2, wherein the workpiece holders are evenly spaced from each other and the transfer path is shorter or longer than the circularly arranged row of forming stations by one pitch of the forming stations or by a whole multiple thereof.

4. Apparatus according to claim 2, wherein the distances between the workpiece holders in the transfer path differ from the distances between the forming stations.

5. Apparatus according to claim 2, wherein the transfer path revolves inside the circle of the forming stations.

6. Apparatus according to claim 2, wherein the transfer path revolves outside the circle of the forming stations.

7. Apparatus according to claim 2, wherein at least one workpiece holder is connected to a spring.

8. Apparatus according to claim 2, wherein the relative movement of tools or workpiece holders is controlled by a control member comprising a controlling cam revolving with the transfer means.

9. Apparatus according to claim 8, wherein the control member comprises a plurality of controlling cams having at least one of a different basic diameter and a different vertical position.

10. An apparatus for forming workpieces, comprising:
a plurality of stationary forming stations disposed in a generally circular arrangement, a plurality of workpiece holders connected in a closed chain-type manner, the number of workpiece holders differing from the number of working stations, and transfer means revolving continually and concentrically relative to the circular arrangement of stationary working stations, the transfer means forming a transfer path along which each of the workpiece holders is transferred individually in succession from one working station to a following working station when the following working station becomes vacant.

11. A method according to claim 1, wherein the row of workpiece holders revolves inside the closed sequence of forming stations, and each workpiece holder interacts with only one-half of the forming stations.

12. An apparatus according to claim 2, wherein the closed row of workpiece holders is disposed inside the circle of forming stations and each workpiece holder interacts with only one-half of the forming stations.

13. Apparatus for forming workpieces, comprising a plurality of stationary forming stations arranged along a circle and a closed row of workpiece holders which are temporarily held in place in the forming stations and are periodically transferred, wherein a transfer means is provided which revolves concentrically to the circle of the forming stations, takes hold of the workpiece holders in succession, and forms transfer path for the holders to be transferred from one forming station to a following forming station, which transfer path contains a number of workpiece holders which differs from the number of forming stations in the area bridged by the transfer path, and wherein the workpiece holders are connected by a guide-link arrangement having a variable distance between the workpiece holders, the size of which distance is determined by a controlling cam.

14. Apparatus for forming workpieces, comprising a plurality of stationary forming stations arranged along a circle and a closed row of workpiece holders which are temporarily held in place in the forming stations and are periodically transferred, wherein a transfer means is provided which revolves concentrically to the circle of the forming stations, takes hold of the workpiece holders in succession, and forms transfer path for the holders to be transferred from one forming station to a following forming station, which transfer path contains a number of workpiece holders which differs from the number of forming stations in the area bridged by the transfer path, and wherein at least one workpiece holder is connected to a spring.

15. Apparatus for forming workpieces, comprising a plurality of stationary forming stations arranged along a circle, a closed row of workpiece holders which are arranged on a conveyor and are temporarily held in place in the forming stations and are periodically transferred by movement of the conveyor, and a transfer means which revolves concentrically to the circle of the forming stations, takes hold of the workpiece holders in succession, and forms transfer path for the holders to be transferred from one forming station to a following forming station, wherein facing a group of n forming stations is a group of (n−1) workpiece holders which are individually connected to the conveyor in such a way that they can be moved in the conveying direction by at least the distance between the forming stations and whose connecting points with the conveyor, revolving concentrically to the sequence of forming stations, are at a distance from one another which is greater than the distance between the forming stations by the factor n/(n−1), wherein a control device is provided for transferring a workpiece holder adjacent to the empty forming station into the empty forming station and for transferring the following workpiece holder into the forming station consequently becoming empty, the control device comprising a tripping means at the forming station which the workpiece holder is to leave and a stop at the forming station which the workpiece holder is to reach, and wherein the workpiece holders are connected to the conveyor by a spring loading them in the transfer direction.

16. Apparatus according to claim 15, wherein the conveyor which is provided for the workpiece holders is arranged in a circular shape, the distance is between adjacent workpiece holders being measured as angular distances.

17. Apparatus according to claim 15, wherein a revolving cam is provided as the tripping means.

18. Apparatus according to claim 11, wherein the transfer means is provided with a drive device for the workpiece holders.

* * * * *

UNITED STATES PATENT AND TRADEMARK OFFICE
CERTIFICATE OF CORRECTION

PATENT NO. : 5,205,392

DATED : April 27, 1993

INVENTOR(S) : Sigurd von Seld

It is certified that error appears in the above-identified patent and that said Letters Patent is hereby corrected as shown below:

Claim 18, column 12, line 1, change "11" to --10--.

Signed and Sealed this

Twenty-third Day of August, 1994

Attest:

BRUCE LEHMAN

*Attesting Officer*    *Commissioner of Patents and Trademarks*